No. 12,421. REISSUED DEC. 12, 1905.

R. C. TURNER.

APPARATUS FOR PURIFYING, STERILIZING, AND AGING LIQUIDS.

APPLICATION FILED JULY 28, 1905.

Witnesses

Edwin L. Bradford

Auguste J. Lip.

Inventor

Robert C. Turner

By H. H. Bliss

Attorney

UNITED STATES PATENT OFFICE.

ROBERT C. TURNER, OF COLUMBUS, OHIO, ASSIGNOR OF ONE-HALF TO CLARENCE E. TURNER, OF COLUMBUS, OHIO.

APPARATUS FOR PURIFYING, STERILIZING, AND AGING LIQUIDS.

No. 12,421. Specification of Reissued Letters Patent. Reissued Dec. 12, 1905.

Original No. 725,803, dated April 21, 1903. Application for reissue filed July 28, 1905. Serial No. 271,707.

*To all whom it may concern:*

Be it known that I, ROBERT C. TURNER, a citizen of the United States, residing at Columbus, in the county of Franklin and State of Ohio, have invented certain new and useful Improvements in Apparatus for Purifying, Sterilizing, or Aging Liquids; of which the following is a specification.

This invention relates to apparatus for purifying, sterilizing, or aging liquids; and it consists in improvements upon the apparatus shown in my Letters Patent of the United States No. 524,121, dated August 7, 1894.

With my present apparatus I am enabled to subject the liquid to be purified, sterilized, or aged to successive electrolytic treatments, the apparatus being so designed that the liquid flows after treatment in one vessel into another or several others in succession, where it is similarly treated.

Figure 1:
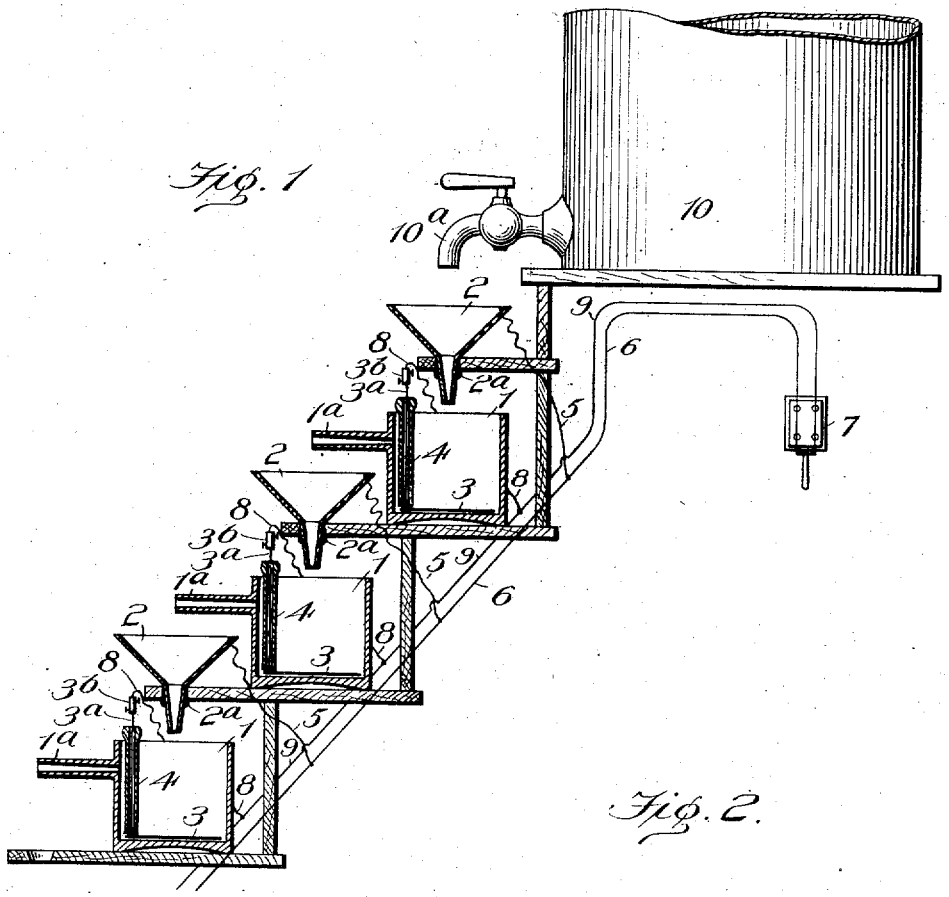
Figure 2:
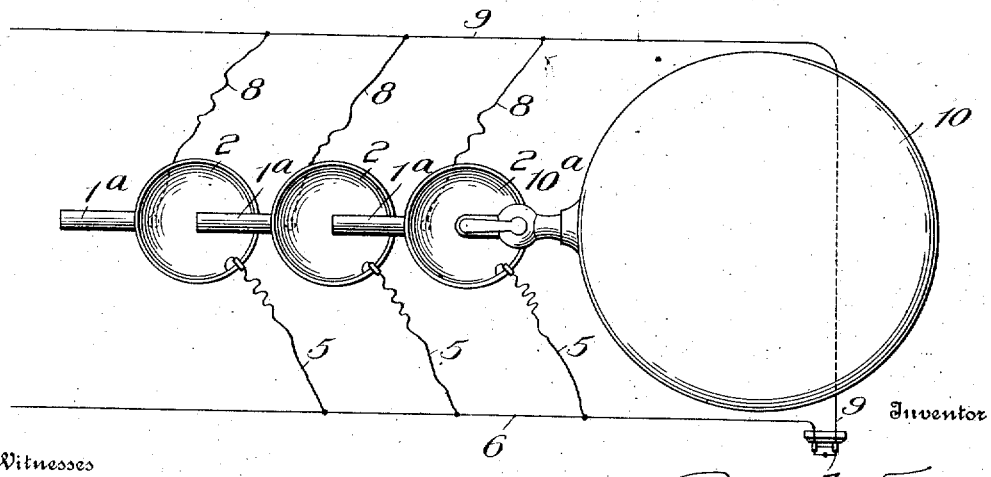

In the accompanying drawings, Figure 1 is a vertical sectional view, some parts being in full lines. Fig. 2 is a diagrammatic plan view.

In the views, 1 designates a vessel of porcelain, glass, or other non-conductor of electricity and of any suitable form and having a spout $1^a$ near its top. There are to be several of these vessels 1, and they are shown to be arranged one above the other, so that their spouts $1^a$ can discharge into a metallic funnel 2, which constitutes one electrode supported with its discharging end above the liquid-level of but so as to discharge into the next vessel below. Arranged in each vessel 1 is an electrode 3, shown to consist of a flat piece or disk of metal, to which is soldered a vertical conducting rod or wire $3^a$; but surrounding the vertical conducting rod or wire $3^a$ is an insulating-tube 4, of porcelain, glass, or other suitable non-conductor of electricity, extending from the bottom to the top of the vessel. To each of the funnels 2 is attached a conducting-wire 5, and all these wires 5 are connected to a main conducting-wire 6, running to a switchboard 7, containing an appropriate switching device. The funnels can be insulated from their supports by bushings $2^a$, of porcelain, glass, or other suitable non-conductor of electricity. Each of the vertical wires $3^a$ in the vessels 1 has coupled to it by means of a suitable coupling device $3^b$ a conducting-wire 8, and all the wires 8 are connected to a main conducting-wire 9. The electric current will be furnished by any suitable generator or from any appropriate source of electricity.

10 denotes a vessel to contain the liquid to be treated and from which the liquid is discharged through a faucet $10^a$ into the uppermost vessel 1. As the liquid flows into the first vessel the stream from the funnel closes the electric circuit from the wire 5 to the wire 8, or reversely, and the stream from the funnel, as well as the liquid in the vessel, is subjected to the electrolytic action due to the passage of the current therethrough. When the liquid in the uppermost vessel rises to the spout $1^a$, it flows into that next below and the electric current is closed through the next wires 5 and 8, and so on through the entire series of vessels. Furthermore, the stream flowing through each of the funnels, because it is small, continuous, and unbroken, is subjected to a higher degree of electric action and at the same time is subjected to the action of the oxygen of the air. The current of electricity will of course be made strong enough to bridge all the streams flowing from the funnels and the liquid in all the vessels. In this way the liquid as it flows down through the series of vessels is subjected successively to the action of electricity and air, and because the vessels have their spouts or outlets at their tops the liquid to be treated tarries awhile in each vessel and is more thoroughly agitated and stirred. The treatment is therefore more thorough and perfect.

From the description above given, taken in connection with the drawings, it will be seen that I provide for passing a body of liquid in a continuous stream which is controllable in amount from one to another along a series of liquid receiving and delivering elements or devices each composed of a pair of insulated vessels, the primary vessel 2 of each element or device delivering the liquid to its secondary vessel 1 in a reduced stream, falling through the open atmosphere, and each two-part element delivering the liquid to the next and electrically subdividing the stream as an entirety, supplying to each subdivision from a source of electric supply currents of electricity in multiple arc while the liquid is flowing from one element to the next in series, the current in each subdivision passing through one of the parts of the stream which is falling through the open air, the several subdivisions of the entire stream being equal electrically—that is, with respect to the length of the circuit therethrough—and the electric character of the conductor therein for the current. By having independent receiving and delivering elements for the liquid I can vary and control the character and extent of treatment to which it is subject, prolonging or shortening it as desired to meet varying circumstances. By forming a reduced stream between each primary vessel and each secondary one and causing the current to pass therethrough as part of the circuit I contract the liquid-path for the current and compel each molecule to be affected uniformly with others, and by causing the stream to drop as a fall from one level to another through the atmosphere, first, I prevent the non-uniform passage of the current through the liquid, which occurs when it is confined within retaining-tubes or vessel-walls, and, secondly, permit the free and quick escape of the undesirable bodies or gases which are formed or generated in the liquid during its treatment and for which as vapor there must be free escape.

I herein—as in the claims, for instance—refer to the fact that a current of electricity passes through the liquid in the vessels of each pair independently of the currents passing through the vessels of the other pairs, meaning that the current which passes through the liquid in any given pair does not also pass through that in any of the other vessels, and hence can attain some of the ends above referred to, such as varying the quantity of current passing through any one of the pairs without affecting that passing through the others.

What I claim, and desire to secure by Letters Patent, is—

1. Apparatus for purifying, sterilizing or aging liquids comprising two or more separate vessels having spouts or outlets near their tops and arranged to discharge from one into the other, a metallic funnel constituting an electrode, arranged to discharge above the liquid-level of the vessel and a metallic piece also constituting an electrode in each of said vessels, and conductors of electricity attached to such electrodes.

2. Apparatus for purifying, sterilizing or aging liquids comprising two or more separate vessels having spouts or outlets near their tops and arranged to discharge from one into the other, a metallic funnel constituting an electrode arranged to discharge above the liquid-level of the vessel, a metallic piece in the bottom of said vessels also constituting an electrode, a conductor of electricity leading from the last-named electrodes out of said vessels, and insulating-tubes for said conductors, substantially as described.

3. In an apparatus for treating liquid, two electrically-insulated vessels, one above the other, arranged to have the liquid flow through a single escape-passage from the upper to the lower in a reduced stream which is exposed throughout to the air, said vessels being adapted each to hold a body of liquid, which bodies are electrically insulated from each other except through the said stream, and an electrical conductor for each vessel electrically connected with the liquid therein, the said conductors for the two vessels being of different polarity said parts being arranged substantially as set forth, to have the electric current flow exclusively along the exposed reduced stream from one vessel to the other.

4. In an apparatus for treating liquid, the combination of a vessel situated at a relatively high level and adapted to permit a flow of liquid in a substantially continuous stream therefrom, an electric conductor adapted to be electrically connected with the liquid in said vessel and to deliver an electric current to the initial end of said stream, a vessel receiving the said stream, and a second electric conductor of different polarity from the first arranged to receive the electric current from the end of said stream, and means for supplying said conductors with electric current, substantially as set forth.

5. In an apparatus for treating liquid, the combination of an upper insulated vessel 2, a lower non-conducting vessel 1, means for delivering liquid from the upper vessel to the lower one in a reduced stream exposed to the open air, the conductor connected electrically with the liquid in the upper vessel, the conductor of different polarity from the first connected electrically with the liquid in the lower vessel, the aforesaid exposed stream electrically connecting the liquid in one vessel with that in the other, the means for supplying said electric conductors with an electric current, and means for controlling the quantity of liquid flowing in said stream, substantially as set forth.

6. In an apparatus for electrically treating liquid, a series of pairs of liquid-receiving vessels, the vessels of each pair being similar to those of the other pairs, one vessel of each pair being relatively higher than its companion vessel, and one vessel of each pair being adapted to deliver liquid to one of the vessels of the succeeding pair, means for causing the liquid to pass in a reduced stream from the first vessel to the second of each pair, and electrodes arranged in pairs and connected with each pair of vessels, the electrode for one vessel of a pair being of opposite polarity to that for the other vessel arranged substantially as set forth whereby a current of electricity can be caused to pass from one vessel of each pair to the other through the said reduced stream, independently of the current passing through the vessels of the other pairs.

7. In an apparatus for electrically treating liquid, a series of pairs of liquid-receiving vessels arranged relatively to each other to have a continuous stream of liquid pass from the vessels of one pair to the vessels of the next, means for causing the liquid to pass from the first vessel of each pair to the second in a relatively reduced stream exposed to the air, and electrodes arranged substantially as set forth whereby a current of electricity can be caused to pass from one vessel of each pair to the other through the said reduced stream the electrode for one vessel of a pair being of opposite polarity to that of the other.

8. In an apparatus for electrically treating liquid, a series of liquid receiving and delivering elements each comprising a primary vessel and a secondary vessel, and each adapted to have a continuous stream of liquid flow therethrough, and each adapted to have the said stream fall therefrom through the open air to the next succeeding element, main electric-supply conductors, and conductors arranged substantially as set forth to cause a series of electric currents to pass respectively each through one of the said liquid receiving and delivering elements and through one of the falling parts of the said stream independently of the others the conductors connected respectively with contiguous vessels in the series being of opposite polarity.

9. In an apparatus for electrically treating liquid, a series of liquid-receiving and liquid-delivering elements each comprising a secondary vessel and a primary vessel, all of the primary vessels being substantially similar to each other, and all of the secondary vessels being substantially similar to each other, each secondary vessel being adapted to deliver liquid to the next primary vessel, an electric supply, and a series of sets of conductors one for each vessel respectively arranged substantially as set forth whereby each of said receiving and delivering devices is supplied with an electric current, independent of the others, said current passing from the supply through a primary vessel and a secondary vessel and through their intervening stream of liquid and then back to the supply, substantially as set forth.

10. In an apparatus for electrically treating liquid, the combination of a series of liquid holding and delivering vessels each adapted to deliver to the next liquid in a continuous stream and to support a part of said stream as a part of an electric circuit, the current-conducting liquid body in each being similar in dimensions to those in the others, a source of electrical supply, and a pair of electric conductors of opposite polarity, one for each of said vessels, said pairs of conductors being arranged respectively similarly relatively to their vessels and relatively to the current-conducting bodies of liquid therein, substantially as set forth.

11. In an apparatus for electrically treating liquid, the combination of a series of liquid receiving and delivering vessels, a source of electrical supply and current conductors respectively interposed between the said source of current-supply and the said vessels, the said vessels being adapted to have a continuous stream of liquid pass through them in series, and the conductors being connected one with each of the vessels and arranged to pass electric currents along the lines of said stream through said vessels in multiple arc, substantially as set forth.

In testimony whereof I affix my signature in presence of two witnesses.

ROBERT C. TURNER.

Witnesses:
C. R. MAYERS,
C. B. WOLFE.